(12) United States Patent
Wright

(10) Patent No.: US 9,920,818 B2
(45) Date of Patent: Mar. 20, 2018

(54) GEARBOXES WITH COMPOUND PLANET GEARS AND METHODS OF OPERATING THEREOF

(71) Applicant: Wrightspeed, Inc., San Jose, CA (US)

(72) Inventor: Ian Wright, San Jose, CA (US)

(73) Assignee: Wrightspeed, Inc., Alameda, CA (US)

(*) Notice: Subject to any disclaimer, the term of this patent is extended or adjusted under 35 U.S.C. 154(b) by 0 days.

(21) Appl. No.: 15/366,197

(22) Filed: Dec. 1, 2016

(65) Prior Publication Data

US 2017/0114870 A1    Apr. 27, 2017

Related U.S. Application Data

(63) Continuation of application No. 15/167,605, filed on May 27, 2016, now Pat. No. 9,541,172.
(Continued)

(51) Int. Cl.
*H02P 17/00*    (2006.01)
*F16H 3/66*    (2006.01)
(Continued)

(52) U.S. Cl.
CPC .......... *F16H 3/666* (2013.01); *F15B 15/149* (2013.01); *F16H 61/0265* (2013.01);
(Continued)

(58) Field of Classification Search
CPC .. F16H 3/666; F16H 63/50; F16H 2200/2005; F16H 2200/0034; F16H 2306/42
See application file for complete search history.

(56) References Cited

U.S. PATENT DOCUMENTS

| 1,998,891 A | 4/1935 | Benson |
| 2,631,476 A | 3/1953 | Ravigneaux |

(Continued)

FOREIGN PATENT DOCUMENTS

| CN | 2875938 | 3/2007 |
| WO | 2007135338 A1 | 11/2007 |

(Continued)

OTHER PUBLICATIONS

"U.S. Appl. No. 15/167,605, Non Final Office Action dated Aug. 29, 2016", 10 pages.
(Continued)

*Primary Examiner* — David J Hlavka
(74) *Attorney, Agent, or Firm* — Kwan & Olynick LLP

(57) ABSTRACT

Provided are gearboxes including compound planet gear assemblies as well as methods of using such gearboxes. A gearbox includes at least a first ring gear and a second ring gear. Depending on the current gear selection, one of these ring gears may be engaged with a shifting mechanism or not engaged with any ring gears when in a neutral gear. The first ring gear may be constantly engaged with a first planet gear of a compound planet gear assembly, while the second ring gear may be constantly engaged with a second planet gear of the same compound planet gear assembly. The first planet gear may be also engaged with a sun gear coupled to a shaft. Another shaft is coupled to the shifting mechanism. Different gear selections of the gearbox engage different ring gears to the shifting mechanism thereby changing the rotational speed ratio of the two shafts.

20 Claims, 10 Drawing Sheets

First Selected Gear

Second Selected Gear

Related U.S. Application Data

(60) Provisional application No. 62/245,846, filed on Oct. 23, 2015.

(51) Int. Cl.
*F16H 61/02* (2006.01)
*F15B 15/14* (2006.01)
*F16H 63/30* (2006.01)
*F16H 63/04* (2006.01)
*F16H 63/50* (2006.01)

(52) U.S. Cl.
CPC ......... *F16H 63/04* (2013.01); *F16H 63/3023* (2013.01); *F16H 63/50* (2013.01); *F16H 2063/3093* (2013.01); *F16H 2200/0034* (2013.01); *F16H 2200/2005* (2013.01); *F16H 2306/42* (2013.01)

(56) References Cited

U.S. PATENT DOCUMENTS

| | | |
|---|---|---|
| 2,761,333 A | 9/1956 | Ravigneaux |
| 2,827,805 A | 3/1958 | Miller |
| 3,675,510 A | 7/1972 | Duggar, Jr. |
| 4,417,484 A | 11/1983 | Gaus et al. |
| 4,431,073 A | 2/1984 | Nagao et al. |
| 4,850,247 A * | 7/1989 | Yu .............................. F16H 1/46 475/342 |
| 5,133,697 A | 7/1992 | Hattori |
| 5,135,444 A | 8/1992 | Hattori |
| 5,769,750 A | 6/1998 | Rickels |
| 6,585,620 B1 * | 7/2003 | Bae .......................... F16H 1/46 475/331 |
| 7,364,526 B2 | 4/2008 | Cho |
| 8,251,158 B2 | 8/2012 | Tomayko et al. |
| 8,360,923 B2 | 1/2013 | Kraynev et al. |
| 9,541,172 B1 | 1/2017 | Wright |
| 2007/0243968 A1 | 10/2007 | Ogata |
| 2011/0242807 A1 | 10/2011 | Little, Jr. et al. |
| 2014/0051537 A1 | 2/2014 | Liu et al. |

FOREIGN PATENT DOCUMENTS

| | | |
|---|---|---|
| WO | 2013177785 A1 | 12/2013 |
| WO | 2017069877 A1 | 4/2017 |

OTHER PUBLICATIONS

"U.S. Appl. No. 15/167,605, Notice of Allowance dated Nov. 14, 2016", 9 pages.

Wright, Ian , "Gearboxes with Compound Planet Gears and Methods of Operating Thereof", International Application Serial No. PCT/US2015/051919, filed Sep. 15, 2016, 45 pages.

"International Application Serial No. PCT/US16/51919, International Search Report and Written Opinion dated Dec. 25, 2016", 10 pages.

\* cited by examiner

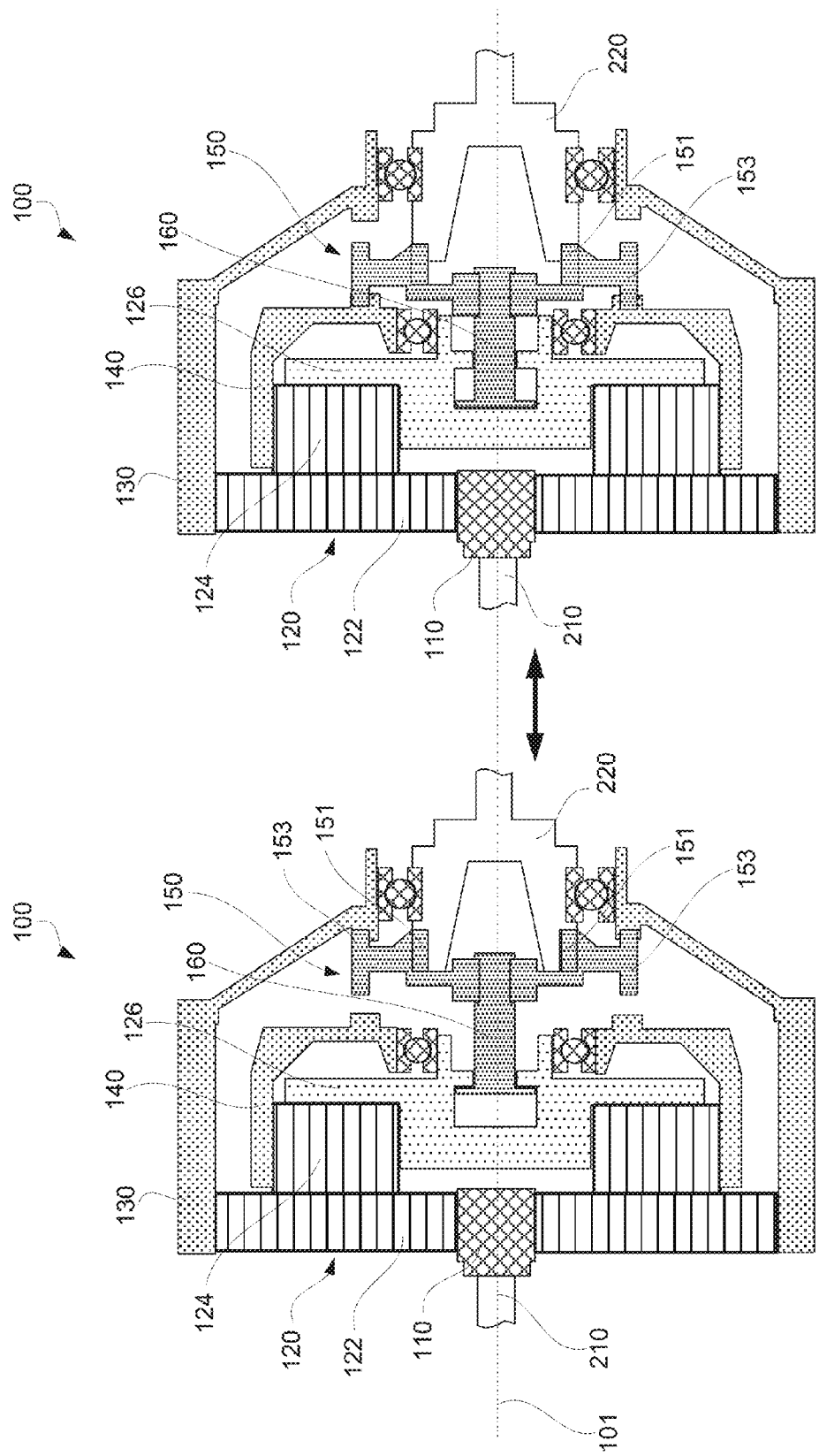
FIG. 1A  First Selected Gear
FIG. 1B  Second Selected Gear

Neutral Selected Gear

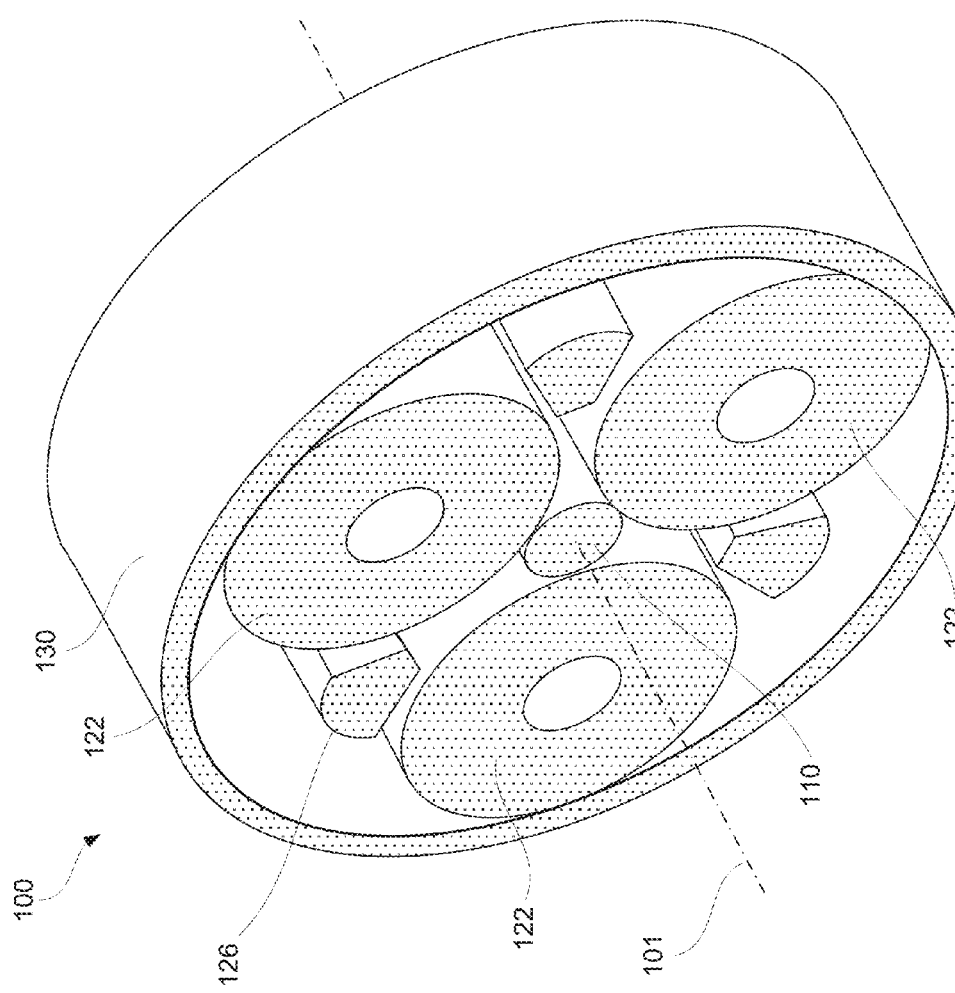

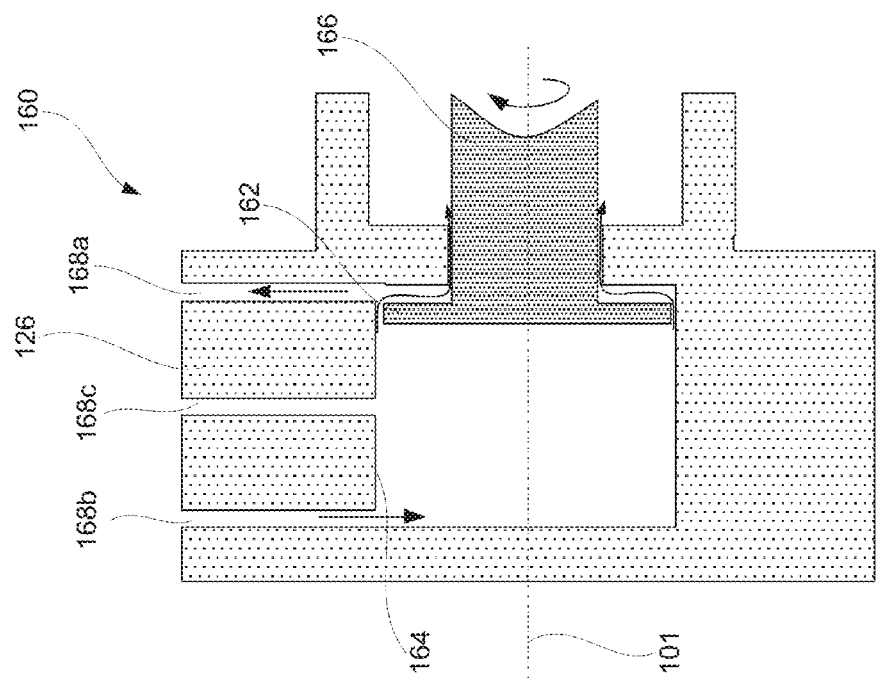
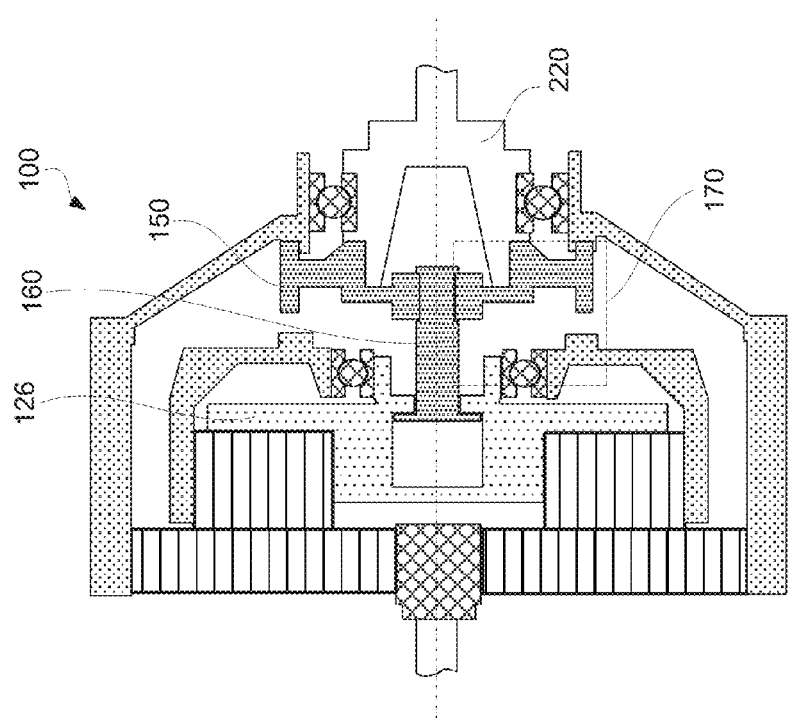
FIG. 2B
FIG. 2A

GEARBOXES WITH COMPOUND PLANET GEARS AND METHODS OF OPERATING THEREOF

CROSS-REFERENCE TO RELATED APPLICATIONS

This application is a continuation of U.S. patent application Ser. No. 15/167,605, entitled: "Gearboxes with Compound Planet Gears and Methods of Operating Thereof" filed on May 27, 2016, which claims the benefit under 35 U.S.C. § 119(e) of U.S. Provisional Patent Application No. 62/245,846, entitled: "Gearboxes with Compound Planet Gears and Methods of Operating Thereof" filed on Oct. 23, 2015. Both priority applications are incorporated herein by reference in their entireties for all purposes.

BACKGROUND

Gearboxes are devices that use gears and gear trains to provide speed and torque conversions between different devices, such as from rotating power sources to other devices. For example, a gearbox may be used in a vehicle between its engine and differential/wheels to adjust the speed and torque applied to the differential/wheels of the vehicle. Gearboxes are typically very complex and bulky assemblies providing multiple gears. These complex designs of the current gearboxes are the result of power outputs available from conventional internal combustion (IC) engines, which are predominant power sources in modern vehicles. At the same time, new power sources, such as electrical engines, with different speed and torque characteristics become available and can utilize different types of gearboxes.

SUMMARY

Provided are gearboxes including compound planet gear assemblies as well as methods using and systems including such gearboxes. A gearbox includes at least two ring gears: a first ring gear and a second ring gear. Depending on the current gear selection, one of these ring gears may be engaged to a shifting mechanism or not engaged to any one of the ring gears when, for the example, the gearbox is in a neutral gear. The first ring gear may be constantly engaged with a first planet gear of a compound planet gear assembly, while the second ring gear may be constantly engaged with a second planet gear of the same compound planet gear assembly. Each pair of the first and second planet gears may be concentric and non-rotatably coupled to each other. As such, the first and second ring gears rotate at different rotational speeds. The first planet gear may be also engaged to a sun gear coupled to or being a part of a shaft. Another shaft is coupled to the shifting mechanism. Different gear selections of the gearbox engage different ring gears to the shifting mechanism thereby changing the rotational speed ratio of the two shafts.

In some embodiments, a gearbox comprises a compound planet gear assembly, a first ring gear, a second ring gear, and a shifting mechanism. The compound planet gear assembly may comprise a first planet gear and a second planet gear. While the following description generally refers the first planet gear as a single gear, one having ordinary skill in the art would understand that the compound planet gear assembly may include a set of multiple first planet gears. For example, the set may include three first planet gears positioned at the same distance from the principal axis of the gearbox and evenly spaced about the principal axis at 120° from each other. Likewise, while the following description generally refers the second planet gear as one gear, one having ordinary skill in the art would understand that the compound planet gear assembly may include a set of multiple second planet gears. For example, the set may include three second planet gears positioned at the same distance from the principal axis of the gearbox and evenly spaced about the principal axis at 120° from each other. In general, each of these sets may include any number of planet gears. The number of first planer gears may be the same as the number of second planet gears and these planet gears may be organized in pairs such that each pair includes one first planet gear and one second planet gear. In each set, the first planet gear may be concentric to the second planet gear and non-rotatably coupled to the second planet gear.

The first planet gear of the compound planet gear assembly may be used for engaging a sun gear coupled to a first shaft. In some embodiments, the sun gear is not a part the gearbox but a part of another component coupled to the gearbox during its operation. For example, the sun gear may be a part of the first shaft, which may be a shaft of a motor, a shaft of another gearbox, and the like. Alternatively, the sun gear is a part of the gear box and is engaged with the first planet gear. For purposes of these documents, the term "engaged," when applied to two engaged gears, means that rotation of one gear around its own axis causes rotation of the other gear around its own axis and/or causes rotation of the one gear about the center of the other gear (e.g., when the other gear is stationary).

The first ring gear may be engaged with the first planet gear of the compound planet gear assembly. Likewise, the second ring gear may be engaged with the second planet gear of the compound planet gear assembly.

The shifting mechanism of the gearbox may be used for coupling to a second shaft, which is different from the first shaft coupled to the sun gear. During operation of the gearbox, the first shaft may be an input shaft, while the second shaft may be an output shaft or vice versa. Since the gearbox is designed to transfer torque between the first shaft and the second shaft in either direction, input-output shaft designation may change (e.g., acceleration v. regenerative breaking of a vehicle equipped with the gearbox).

The shifting mechanism may be alternatively engaged with either the first ring gear or the second ring gear or not engaged to either one of these ring gears. It should be noted that the shifting mechanism may be engaged to only one of the first ring gear or the second ring gear at one time, but not both the first ring gear and the second ring gear. During operation of the gearbox, the first ring gear and the second ring gear rotate with different speeds, which precludes a possibility of the shifting mechanism being engaged with both the first ring gear and the second ring gear. It should be also noted that, in some embodiments, the shifting mechanism may not be engaged with either one of the first ring gear or the second ring gear. For example, the gearbox may be in a neutral gear.

When the shifting mechanism is engaged with the first ring gear, the gearbox is in the first selected gear. On other hand, when the shifting mechanism is engaged with the second ring gear, the gearbox is in the second selected gear. The terms "first selected gear", "second selected gear", and "neutral gear" refer to the state of the gearbox rather than to any of its components, e.g., actual physical gears. As noted above, the ratio of the rotational speed of the first shaft to the rotational speed of the second shaft changes as the gearbox is shifted between the first selected gear and the second selected gear. Furthermore, the first shaft is decoupled from the second shaft when the gearbox is in the neutral gear. In this case, the first shaft and the second shaft can rotate independently from each other.

In some embodiments, the shifting mechanism is slidable along the principal axis of the gearbox relative to the first ring gear and relative to the second ring gear or, more specifically, between the first ring gear and the second ring gear. Depending on the sliding position of the shifting mechanism, the shifting mechanism may be engaged with the first ring gear (but not the second ring gear), engaged with the second ring gear (but the first ring gear), or not engaged to either the first ring gear or the second ring gear. As such, sliding the shifting mechanism along the principal axis of the gearbox may change the selected gear of the gearbox, e.g., between the first selected gear, the neutral gear, or the second selected gear.

In some embodiments, the shifting mechanism comprises a sliding spline for maintaining the coupling to the second shaft. This coupling is maintained while the shifting mechanism slides along the principal axis of the gearbox relative to the first ring gear and the second ring gear. In other words, the second shaft may be stationary, while the shifting mechanism may slide relative to the second shaft along the principal axis of the gearbox. The coupling to the second shaft is continuously maintained while the shifting mechanism slides.

In some embodiments, the shifting mechanism comprises a gear engagement portion alternatively engaging the first ring gear or the second ring gear or not engaging any ring gear. This engagement is established when the shifting mechanism is slid along the principal axis of the gearbox relative to the first ring gear and relative to the second ring gear as noted above. In the neutral gear, the engagement portion may be positioned between the first ring gear and the second ring gear without engaging either one of these ring gears. As such, the dimension of the engagement portion in the direction parallel to the principal axis of the gearbox may be less than the gap between the first ring gear and the second ring gear at that location.

In some embodiments, the gearbox also comprises an actuator coupled to the shifting mechanism. The actuator may be used for sliding the shifting mechanism along the principal axis of the gearbox relative to the first ring gear and relative to the second ring gear. The actuator may comprise an actuator cylinder and an actuator piston disposed within the actuator cylinder or, more specifically, slidably disposed within the actuator cylinder. In some embodiments, the actuator is a hydraulic actuator and may use gear oil of the gearbox for its operation. For example, the oil may be pumped on either side of the piston to advance the piston to the other side. The actuator cylinder may be formed by a planet gear carrier of the compound planet gear assembly. The actuator piston is rotatable relative to the actuator cylinder. Furthermore, small amounts of oil may be allowed to pass between the actuator cylinder and the actuator piston without interfering the performance of the actuator.

In some embodiments, the actuator comprises a first channel and a second channel for supplying and/or removing a hydraulic fluid into/from the actuator cylinder. The first channel and the second channel are disposed at different ends of the actuator cylinder. As such, when the hydraulic fluid is flown into the actuator cylinder through the first channel, the actuator piston may be forced towards the end of the actuator cylinder having the second channel. In this example, the second channel may allow the hydraulic fluid to flow out of the actuator cylinder so that the actuator piston is allowed to move to this end. This movement of the actuator piston causes the shifting mechanism to slide along the principal axis of the gearbox in the same direction. Alternatively, when the hydraulic fluid is flown into the actuator cylinder the through the second channel, the actuator piston may be pushed towards the end of the actuator cylinder having the first channel. In this example, the first channel may allow the hydraulic fluid to flow out of the actuator cylinder. This movement of the actuator piston also causes the shifting mechanism to slide along the principal axis of the gearbox, but now in the opposite direction.

In some embodiments, the actuator comprises a third channel for supplying and/or removing the hydraulic fluid into/from the actuator cylinder. The third channel may be disposed between the first channel and the second channel. For example, when the gearbox needs to be switched into the neutral gear, the hydraulic fluid may be flown into the actuator cylinder through both the first channel and the second channel and allowed to flow out of the third channel. The actuator piston may be pushed towards the third channel, and the shifting mechanism may slide along the principal axis of the gearbox into a position where the shifting mechanism is not engaged with either the first ring gear or the second ring gear.

In some embodiments, the shifting mechanism is rotatably supported by the planet gear carrier of the compound planet gear assembly using the actuator. Specifically, the actuator may be rotatably supported by the planet gear carrier. For example, the round actuator shaft may protrude through a round opening in the planet gear carrier such that the planet gear carrier provides some radial support while allowing the actuator to rotate around the principal axis of the gearbox and slide along the principal axis. As noted above, the shifting mechanism is coupled to the actuator. This coupling may be non-rotatable. Furthermore, this coupling between the shifting mechanism and the actuator does not allow the shifting mechanism to slide relative to the actuator along the principal axis of the gearbox.

In some embodiments, the second ring gear is rotatably supported by a planet gear carrier of the compound planet gear assembly. For example, a bearing may be positioned between the second ring gear and the planet gear carrier. As such, the planet gear carrier may be stationary.

In some embodiments, the first ring gear is rotatably supported by the second shaft. For example, a bearing may be positioned between the first ring gear and the second shaft. This feature allows for the first ring gear and the second shaft to rotate with different speeds, e.g., when the second shaft is engaged through the shifting mechanism to the second ring gear.

In some embodiments, the gearbox further comprises a housing. The planet gear carrier of the compound planet gear assembly may be non-rotatable supported by the housing. For example, the planet gear carrier may have supports extending to the housing between first planet gears and between second planet gears.

In some embodiments, the shifting mechanism is slidably supported by the second shaft. For example, the shifting mechanism may include a sliding spline engaging a corresponding feature on the second shaft. While this support allows for the shifting mechanism to slide along the principal axis of the gearbox relative to the second shaft, it does not allow the shifting mechanism to rotate relative to the second shaft. As such, a torque can be transferred between the shifting mechanism and the second shaft even though the shifting mechanism can slide with respect to the second shaft.

In some embodiments, the first planet gear is concentric to the second planet gear. When multiple first planet gears and multiple second planet gears are used, these gears may be arranged in pairs such that each pair has one first planet gear to the corresponding second planet gear. In some embodiments, the first planet gear is non-rotatably coupled to the second planet gear. In other words, the first planet gear cannot rotate with respect to the second planet gear. When the first planet gear is rotated, the second planet gear is rotated in the same direction and with the same speed. Furthermore, the first planet gear has a different diameter than the second planet gear. Likewise, the first ring gear has a different diameter than the second ring gear. The first planet gear continuously engages to the first ring gear. Likewise, the second planet gear continuously engages to the second ring gear. Furthermore, the planet gear carrier of the compound planet gear assembly is stationary.

Provided also is a method of operating a gearbox. Various examples of the gearbox are described above. The method may comprise applying torque to the first shaft coupled to the sun gear while the gearbox is in the first selected gear. At the time of applying the torque, the first planet gear of the compound planet gear assembly is engaged with the sun gear and the first ring gear. The first ring gear is engaged with the shifting mechanism while the gearbox is in the first selected gear. The second ring gear engages the second planet gear of the compound planet gear assembly. Furthermore, the second ring gear is not engaged with the shifting mechanism while the gearbox is in the first selected gear. In some embodiments, the planet gear carrier of the compound planet gear assembly is stationary when applying the torque to the first shaft thereby rotating the sun gear.

The method may proceed with shifting from the first selected gear to the second selected gear of the gearbox and, after shifting into the second selected gear, applying the torque to the first shaft. The second ring gear is engaged with the shifting mechanism while the gearbox is in the second selected gear. The first ring gear is not engaged with the shifting mechanism while the gearbox is in the second selected gear.

One having ordinary skill in the art would recognize that even though the description of method refers to the torque being transferred from the first shaft to the second shaft, the torque transfer from the second shaft to the first shaft is also within the scope.

The shifting from the first selected gear and into the second selected gear of the gearbox may comprise removing the torque applied to the first shaft, shifting from the first selected gear to a neutral gear of the gearbox, changing a rotational speed of the first shaft, and shifting from the neutral gear to the first selected gear of the gearbox. In some embodiments, removing the torque applied to the first shaft comprises controlling a motor coupled to the first shaft. When the gearbox is in the neutral gear, neither the first ring gear nor the second ring gear is engaged to the shifting mechanism. In some embodiments, shifting from the first selected gear to the neutral gear of the gearbox comprises sliding the shifting mechanism along a principal axis of the gearbox away from the first ring gear. Sliding the shifting mechanism may be completed prior to contacting the second ring gear. In some embodiments, changing the rotational speed of the first shaft comprises matching a rotation speed of the second ring gear to a rotation speed of the second shaft. Matching the rotation speed of the second ring gear to the rotation speed of the second shaft may comprise receiving an input from a sensor indicating the rotation speed of the second shaft and calculating the rotational speed of the first shaft. In some embodiments, changing the rotational speed of the first shaft comprises controlling a motor coupled to the first shaft. Shifting from the neutral gear into the second selected gear of the gearbox may comprise sliding the shifting mechanism along a principal axis of the gearbox away from the first ring gear.

In some embodiments, the method further comprises shifting from the second selected gear to the first selected gear of the gearbox and applying the torque to the first shaft while the gearbox is in the first selected gear. The second ring gear is not engaged with the shifting mechanism while the gearbox is in the first selected gear. On the other hand, the first ring gear is engaged with the shifting mechanism while the gearbox is in the first selected gear.

In some embodiments, the method further comprises shift to the neutral gear of the gearbox. The second ring gear is not engaged with the shifting mechanism while the gearbox is in the neutral gear. Furthermore, the first ring gear is not engaged with the shifting mechanism while the gearbox is in the neutral gear.

These and other embodiments are described further below with reference to the figures.

BRIEF DESCRIPTION OF THE DRAWINGS

FIGS. 1A-1C are schematic cross-sectional representations of a gearbox having different gears selected, in accordance with some embodiments.

FIG. 1D is a schematic perspective representation of a gearbox illustrating a first ring gear, a set of first planet gears, and a portion of a planet gear carrier, in accordance with some embodiments.

FIGS. 2A-2B are schematic cross-sectional representations of a gearbox showing an actuator and a shifting mechanism, in accordance with some embodiments.

DETAILED DESCRIPTION

Figure 1C:
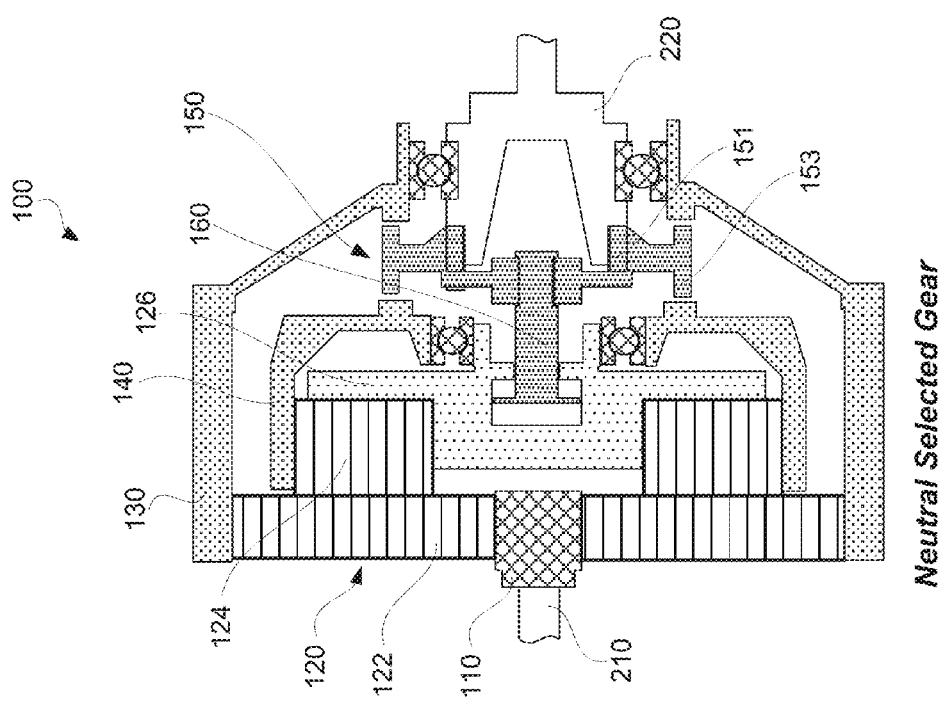
Figure 1E:
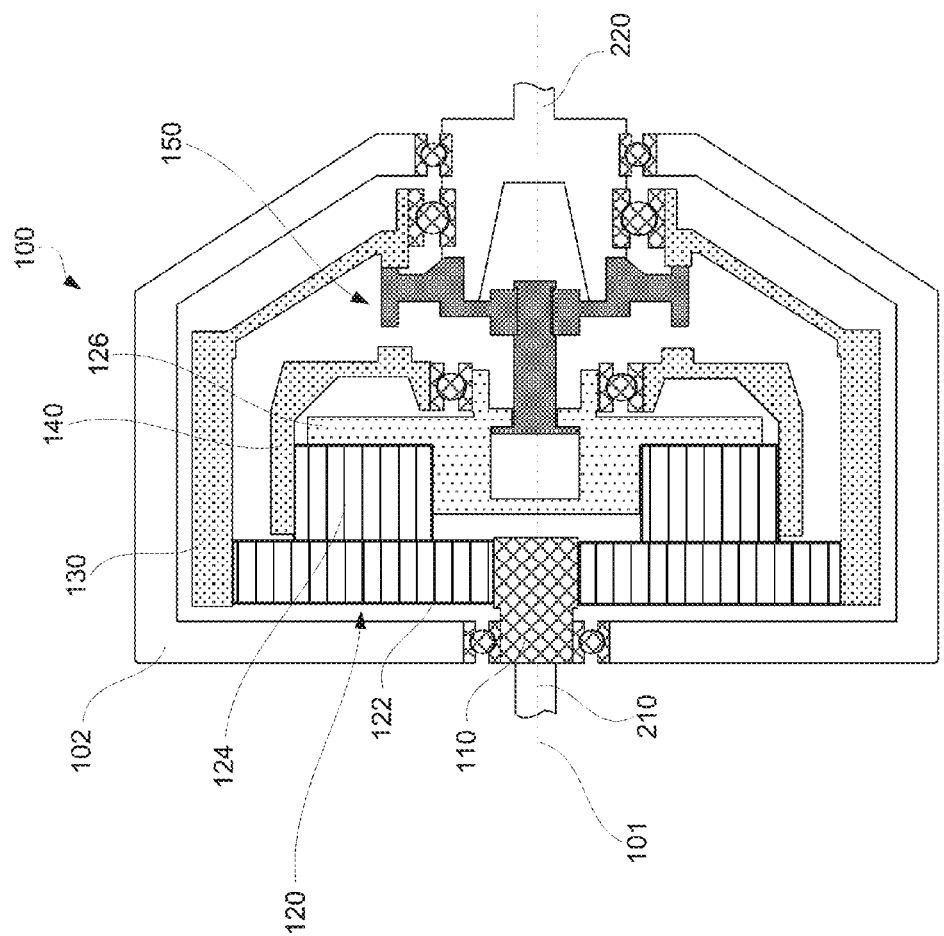
FIG. 1E is a schematic cross-sectional representation of a gearbox including a housing, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Conventional gearboxes are too complex and bulky for many applications. Furthermore, some applications do needs many gear options available in conventional gearboxes. For example, electrical motors can be easily controlled and rotate in both directions and with a wide range of speeds in comparison to internal combustion (IC) engines. The electrical motors are also very compact and multiple motors can be independently used on the same vehicle. For example, a separate electrical motor can be dedicated to a different axle or even to an individual wheel of the vehicle. This configuration may need small compact gearboxes with fewer gear selection options, such as two gears.

Gearboxes described herein can be made very compact yet capable of handling large torques and high speeds. Depending on applications, these gearboxes may be used with or without a clutch. For example, various speed matching and orientation tracking options may be used as described below eliminating the need for a clutch. As such, in some embodiments, this gearbox may be used in a clutch-less system.

In some embodiments, the first ring gear may be constantly engaged with a first planet gear of a compound planet gear assembly, while the second ring gear may be constantly engaged with a second planet gear of the same compound planet gear assembly. The first planet gear may be also engaged with a sun gear, which may be coupled to or may be a part of another shaft. As such, the shaft coupled to the sun gear may rotate the sun gear, which in turn rotates the first planet gear and the second planet gear. The planet gears rotate their respective ring gears at different speeds. Selecting a different gear engages a different ring gear with the shifting mechanism thereby changing the rotational speed ratio of the shafts.

In some embodiments, a gearbox oil used for lubricating gears in the gearbox may be also utilized for hydraulic actuation. This approach eliminates a need for seals within the gearbox, which reduces its cost and complexity. The gearbox may be built with a few gears. For example, a gearbox includes two ring gears, i.e., a first ring gear and a second ring gear such that each gear being responsible for a different gear selection/ration of the gearbox. Specifically, depending on the current gear selection of the gearbox, one of these ring gears may be engaged to a shifting mechanism, which may be coupled to a shaft, e.g., an input shaft or an output shaft. In a neutral gear, neither ring gear is engaged.

Gearbox Examples

FIGS. 1A-1C are schematic cross-sectional representations of gearbox 100 having different gears selected in each of these figures, in accordance with some embodiments. For purposes of this disclosures, the selected gears refer to different gear ratios between two shafts coupled to gearbox 100. In other words, the selected gear in reference to gearbox 100 is a particular state of gearbox 100 and should not be confused with any physical components of gearbox 100. For example, the neutral gear refers to a state when two shafts connected to gearbox 100 are decoupled by gearbox 100 and can independent rotate with respect to each other.

Referring to FIGS. 1A-1C, gearbox 100 comprises compound planet gear assembly 120, first ring gear 130, and second ring gear 140, and shifting mechanism 150. Other components of gearbox 100 may include, but not limited to, actuator 160, housing 102, and second shaft 220. First shaft 210 and sun gear 110 may be also parts of gearbox 100 or may be external components coupled to gearbox 100 during its installation and/or operation. Each of these components will now be described in more details.

Compound planet gear assembly 120 may comprise first planet gear 122 and second planet gear 124. In some embodiments, compound planet gear assembly 120 may include multiple first planet gears 122 disposed at the same distance from principal axis 101 of gearbox 100. In some embodiments, first planet gears 122 are evenly spaced about principal axis 101. For example, FIG. 1D illustrates an example of gearbox 100 including three first planet gears 122 disposed positioned at the same distance from principal axis 101 of gearbox 100 and spaced about principal axis 101 at 120° from each other. This arrangement of three first planet gears 122 can be also seen in FIG. 3. One having ordinary skill in the art would understand that other configuration with a different number of first planet gears 122 are also within the scope.

Regardless of the number of first planet gears 122, each first planet gear 122 may have a corresponding second planet gear 124. Specifically, each first planet gear 122 may be concentric to corresponding second planet gear 124 as, for example, shown in FIG. 3. When multiple first planet gears 122 and multiple second planet gears 124 are used, these gears may be arranged in pairs such that each pair has one first planet gear 122 and one second planet gear 124. In each pair, first planet gear 122 is non-rotatably coupled to corresponding second planet gear 124. In other words, first planet gear 122 cannot rotate with respect to second planet gear 124 in that pair. As such, the rotational speeds and directions of first planet gear 122 and second planet gear 124 with respect to their shared axis is the same. Furthermore, first planet gear 122 has a different diameter than second planet gear 124. The ratio of the diameter of first planet gear 122 to the diameter of second planet gear 124 may be between about 25 and 1.1 or, more specifically, between about 10 and 1.5, or even between 5 and 2.

Compound planet gear assembly 120 may also comprise planet gear carrier 126 providing support to first planet gear 122 and second planet gear 124. First planet gear 122 and second planet gear 124 are rotatably coupled to planet gear carrier 126 such that each pair of first planet gear 122 and second planet gear 124 can rotate, as a pair, with respect to planet gear carrier 126. As noted above, first planet gear 122 does not rotate with respect to second planet gear 124. Planet gear carrier 126 may be supported by housing 102 as further described below.

First planet gear 122 may be engaged to sun gear 110 coupled to first shaft 210 as shown in FIGS. 1A-1D and FIG. 3. In some embodiments, sun gear 110 is not a part gearbox 100 but a part of another component coupled to gearbox 100 during its installation or operation. For example, sun gear 110 may be a part of first shaft 210, which may be a shaft of a motor, a shaft of another gearbox, or any other like device.

First planet gear 122 may be engaged to first ring gear 130, while second planet gear 124 may be engaged to second ring gear 140. Even though the rotational speeds of first planet gear 122 and second planet gear 124 are the same, the rotational speeds of first ring gear 130 and second ring gear 140 are different because of different diameters of first planet gear 122 and second planet gear 124 and different diameters of first ring gear 130 and second ring gear 140. The ratio of the diameter of first ring gear 130 to the diameter of second ring gear 140 may be between about 25 and 1.1 or, more specifically, between about 10 and 1.2, or even between 3 and 1.3. As shown in FIGS. 1A-1C, first ring gear 130 may at least partially enclose second ring gear 140 as well as many other components of gearbox 100.

In some embodiments, first planet gear 122 is continuously engaged to first ring gear 130. Likewise, second planet gear 124 may be continuously engaged to second ring gear 140. As such, when sun gear 110 rotates thereby causing rotation of each of first planet gear 122 and second planet gear 124, first ring gear 130 and second ring gear 140 also rotate but at different rotational speeds. Planet gear carrier 126 of compound planet gear assembly 120 may remain stationary, e.g., may be connected to a housing.

Shifting mechanism 150 may be coupled to second shaft 220. In some embodiments, second shaft 220 is a part of gearbox 100 and may be used to provide support to shifting mechanism 150 and/or to first ring gear 130. Alternatively, second shaft 220 may be coupled to gearbox 100 during its installation and/or operation.

Shifting mechanism 150 may be alternatively engaged with either first ring gear 130 or second ring gear 140 but not both at the same time. When gearbox 100 is in the first selected gear as, for example, shown in FIG. 1A, shifting mechanism 150 is engaged with first ring gear 130. Alternatively, when gearbox 100 is in the second selected gear as, for example, shown in FIG. 1B, shifting mechanism 150 is engaged with second ring gear 140. The ratio of the rotational speed of first shaft 210 to the rotational speed of second shaft 220 changes as gearbox 100 is shifted between the first selected gear and the second selected gear.

Shifting mechanism 150 may not be engaged with either one of first ring gear 130 or second ring gear 140. For example, gearbox 100 may be in the neutral selected gear as, for example, shown in FIG. 1C. In this state, first shaft 210 is decoupled from second shaft 220 when gearbox 100 and each of first shaft 210 and second shaft 220 can rotate independently from each other In some embodiments, shifting mechanism 150 is slidable along principal axis 101 of gearbox 100 relative to first ring gear 130 and relative to second ring gear 140 as comparatively shown in FIGS. 1A-1C. Depending on the sliding position of shifting mechanism 150, shifting mechanism 150 may be: (1) engaged with first ring gear 130 but not second ring gear 140, e.g., gearbox 100 is in the first selected gear as, for example, shown in FIG. 1A, (2) engaged with second ring gear 140 but not with first ring gear 130, e.g., gearbox 100 is in the second selected gear as, for example, shown in FIG. 1B, or (3) not engaged to either one of first ring gear 130 or second ring gear 140, e.g., gearbox 100 is in the neutral selected gear as, for example, shown in FIG. 1C. As such, the process of sliding shifting mechanism 150 along principal axis 101 of gearbox 100 effectively change the gear selection of gearbox 100.

In some embodiments, shifting mechanism 150 comprises sliding spline 151 as, for example, shown in FIG. 1A. Sliding spline 151 may be used for maintaining coupling to second shaft 220 while shifting mechanism 150 slides along principal axis 101 of gearbox 100 relative to first ring gear 130 and relative to second ring gear 140. In other words, second shaft 220 may be stationary and may not slide along principal axis 101, while shifting mechanism 150 may slide along principal axis 101 and maintain the coupling to second shaft 220 at the same time, as schematically shown by FIGS. 1A-1C. Even though the coupling overlap between shifting mechanism 150 and second shaft 220 may be less in the second selected gear (as, for example, shown FIG. 1B) than in the first selected gear (as, for example, shown FIG. 1C), the slidable but not-rotatable coupling is maintained between shifting mechanism 150 and second shaft 220 is maintained in both instances, i.e., during both gear selections.

In some embodiments, shifting mechanism 150 comprises gear engagement portion 153 alternatively engaging first ring gear 130 or second ring gear 140 as shifting mechanism 150 is slid along principal axis 101 of gearbox 100. In the neutral selected gear of gearbox 100, engagement portion 153 may be positioned between first ring gear 130 and second ring gear 140 without engaging either one of these ring gears. As such, the dimension of engagement portion 153 in the direction parallel to principal axis 101 of gearbox 100 may be less than the gap between first ring gear 130 and second ring gear 140 at that location thereby allowing gearbox 100 to be in the neutral selected gear and shifting mechanism 150 not being engaged by either first ring gear 130 or second ring gear 140.

In some embodiments, gearbox 100 also comprises actuator 160 coupled to shifting mechanism 150 as, for example, shown in FIGS. 2A-2B. Actuator 160 may be used for sliding shifting mechanism 150 along principal axis 101 of gearbox 100. In other words, a force (e.g., a hydraulic force) applied to actuator 160 may cause actuator 160 and shifting mechanism 150 to slide into a new position.

As shown in FIG. 2B, actuator 160 may comprise actuator cylinder 164 and actuator piston 162 slidable disposed within actuator cylinder 164. Actuator piston 162 may be coupled or be a part of actuator shaft 166 protruding through an opening in actuator cylinder 164 and coupled to shifting mechanism 150. Actuator cylinder 164 may be formed by planet gear carrier 126 of compound planet gear assembly 120. Actuator piston 162 may be rotatable relative to actuator cylinder 164. Specifically, actuator cylinder 154 may be stationary, while actuator piston 162 may rotate with the same speed as second shaft 220.

In some embodiments, actuator 160 is a hydraulic actuator and may use gear oil of gearbox 100 for its operation. Small amounts of the oil or, more generally, of the hydraulic fluid, may be allowed to pass between actuator cylinder 164 and actuator piston 162 without interfering with the operation of actuator 160. Furthermore, small amounts of oil may be allowed to pass between actuator shaft 166 and opening of actuator cylinder 164, through which actuator shaft 166 protrudes. No seals may be used on these paths.

In some embodiments, actuator 160 comprises first channel 168a and second channel 168b for supplying and/or removing the hydraulic fluid into/from actuator cylinder 164. First channel 168a and second channel 168b may be disposed at different ends of actuator cylinder 164 as, for example, shown in FIG. 2B. As such, when the hydraulic fluid is flown into actuator cylinder 164 through first channel 168a, actuator piston 162 may be pushed by this fluid toward the end of actuator cylinder 164 having second channel 168b. If there is any fluid on the other side of actuator piston, this fluid is allowed to flow out of actuator cylinder 164 through, for example, second channel 168b. As such, first channel 168a may be pressurized while second channel 168b may be kept at a lower pressure causing actuator piston 162 to move along principal axis 101 from first channel 168a to second channel 168b. This movement of actuator piston 162 causes shifting mechanism 150 to slide along principal axis 101 in the same direction and toward second ring gear 140.

Alternatively, when the hydraulic fluid is flown into actuator cylinder 164 through second channel 168b, actuator piston 162 may be pushed towards the end of actuator cylinder 164 having first channel 168a, which may allow the hydraulic fluid to flow out of actuator cylinder 164. This movement of actuator piston 162 also causes shifting mechanism 150 to slide along principal axis 101, but now in the opposite direction, toward first ring gear 130.

In some embodiments, actuator 160 comprises third channel 168b for supplying and/or removing the hydraulic fluid into/from actuator cylinder 164. Third channel 168c may be disposed between first channel 168a and second channel 168b as, for example, shown in FIG. 2B. For example, when gearbox 100 needs to be switched into the neutral gear, the hydraulic fluid may be flown into actuator cylinder 164 through both first channel 168a and second channel 168b and allowed to flow out of third channel 168c. Actuator piston 162 may be pushed towards third channel 168c, and shifting mechanism 150 may slide along principal axis 101 into a position where shifting mechanism 150 is not engaged with either first ring gear 130 or second ring gear 140 as, for example, shown in FIG. 1C.

In some embodiments, shifting mechanism 150 is rotatably supported by planet gear carrier 126 of compound planet gear assembly 120 using actuator 160 as, for example, shown in FIG. 2A. Specifically, actuator 160 may be rotatably supported by planet gear carrier 126. For example, round actuator shaft 166 may protrude through a round opening in planet gear carrier 126 such that planet gear carrier 126 provides some radial support while allowing actuator 160 to rotate around principal axis 101 and slide along principal axis 101 as, for example, shown in FIG. 2B. As noted above, shifting mechanism 150 is coupled to actuator 160. This coupling may be non-rotatable. Furthermore, this coupling between shifting mechanism 150 and actuator 160 does not allow shifting mechanism 150 to slide relative to actuator 160 along principal axis 101 of gearbox 100.

In some embodiments, second ring gear 140 is rotatably supported by planet gear carrier 126 of compound planet gear assembly 120 as shown in FIGS. 1A-1C. For example, a bearing may be positioned between second ring gear 140 and planet gear carrier 126. As such, planet gear carrier 126 may be stationary and may be supported by housing.

In some embodiments, first ring gear 130 is rotatably supported by second shaft 220 as shown in FIGS. 1A-1C. For example, a bearing may be positioned between first ring gear 130 and second shaft 220. This feature allows first ring gear 130 and second shaft 220 to rotate with different speeds, e.g., when second shaft 220 is engaged through shifting mechanism 150 to second ring gear 140. Second shaft 220 may be also used for supporting shifting mechanism 150 and support/be supported by housing 102.

In some embodiments, gearbox 100 further comprises housing 102. Planet gear carrier 126 of compound planet gear assembly 120 may be non-rotatable supported by housing 102. For example, planet gear carrier 126 may have supports extending to housing 102 through in between first planet gears 122 as schematically shown in FIG. 1D.

In some embodiments, shifting mechanism 150 is slidably supported by second shaft 220. For example, shifting mechanism 150 may include sliding spline 151 engaging a corresponding feature on second shaft 220 as described above. While this support allows for shifting mechanism 150 to slide along principal axis 101 of gearbox 100 relative to second shaft 220, it does not allow shifting mechanism 150 to rotate relative to second shaft 220. As such, a torque can be transferred between shifting mechanism 150 and second shaft 220 even though shifting mechanism 150 can slide with respect to second shaft 220.

Two gear ratios provided by gearbox 100 may be set by the first selected gear and the second selected gear. The gear ratio corresponding to the first selected gear may be the diameter of first ring gear 130 divided by the diameter of sun gear 110. The gear ratio corresponding to the first selected gear may be may be between about 2 and 1000 or, more specifically, 3 and 100, or even 5 and 20. The gear ratio corresponding to the second selected gear may be a first sub-ratio of the diameter of the first planet gear 121 divided by the diameter of sun gear 110 multiplied by a second sub-ratio of the diameter of second ring gear 140 divided the diameter of second planet gear 124. The gear ratio corresponding to the second selected gear may be between about 1.25 and 500 or, more specifically, 2 and 50, or even 3 and 10.

Figure 2C:
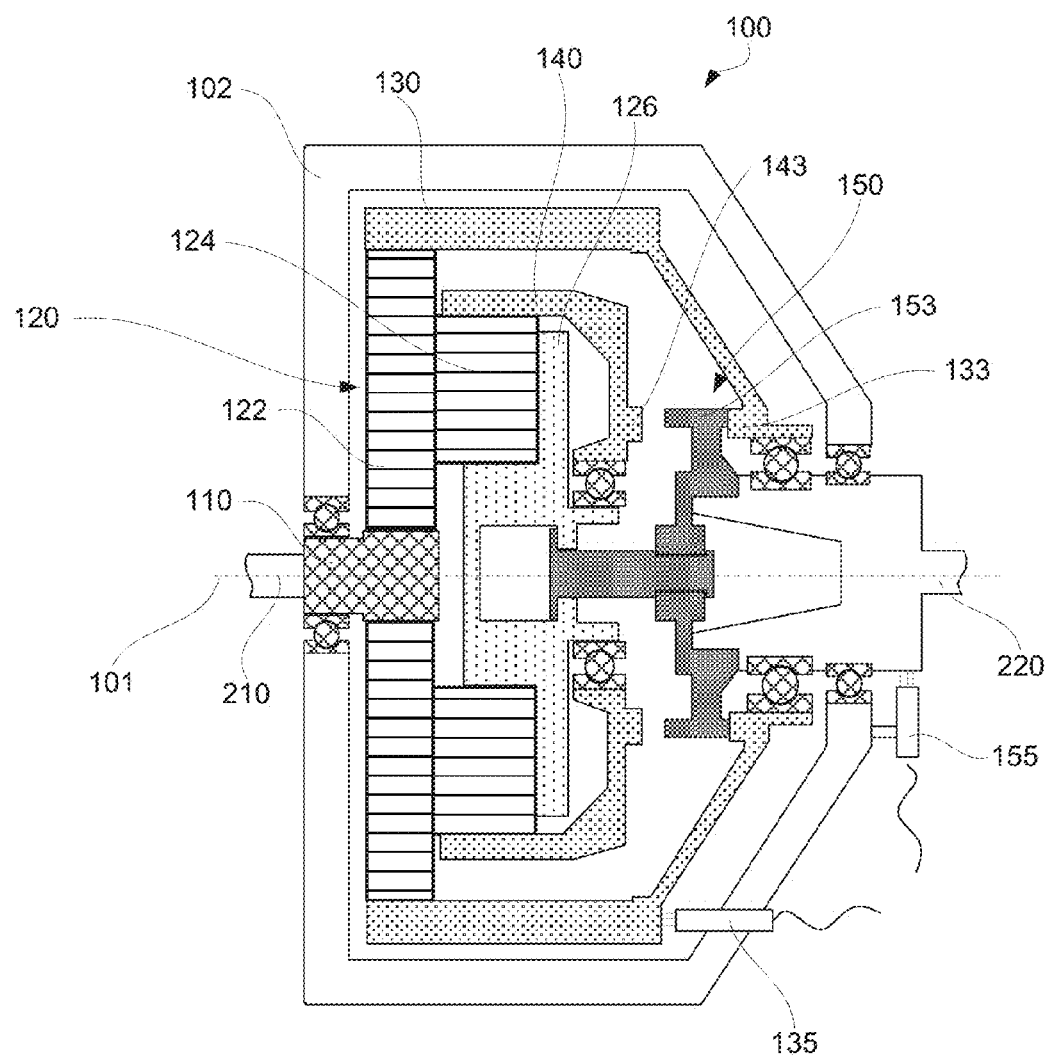
FIG. 2C is a schematic cross-sectional representation of a portion of the gearbox illustrated in FIG. 2A showing engagement portions of a second ring gear and of a shifting mechanism, in accordance with some embodiments.

FIG. 2C is a schematic cross-sectional representation of gearbox 100 illustrating sensors 135 and 155, in accordance with some embodiments. Sensor 135 may be used to determine the angular position of first ring gear 130, while sensor 155 may be used to determine the angular position of shifting mechanism 150. More specifically, sensor 155 determines the angular position of second shaft 220. However, due to the non-rotatable (and slidable) coupling between second shaft 220 and shifting mechanism 150, the angular position of second shaft 220 corresponds to the angular position of shifting mechanism 150 and this relative may be maintained constant during operation of gearbox 100. The angular position of second ring gear 140 may be determined based on the angular position of first ring gear 130, since second ring gear 140 and first ring gear 130 remain coupled through compound planet gear assembly 120 during operation of gearbox 100. It should be noted that the relative angular positions of first ring gear 130 and second ring gear 140 will change as these gears rotate but the relationship between the angular positions is still maintained and can be identified based on the gear ratios. Alternatively, a separate sensor may be used to determine the angular position of second ring gear 140 directly. One or more of these angular positions may be referenced to a stationary component, such as housing 102. The angular positions may be used to ensure smooth engagement of shifting mechanism 150 with either first ring gear 130 or second ring gear 140.

Referring to FIG. 2C, first ring gear 130 includes first engagement portions 133, second ring gear 140 includes second engagement portions 143, and shifting mechanism 150 includes shifting engagement portion 153. Shifting engagement portions 153 may engage with first engagement portions 133 (when gearbox 100 is in the first gear, as, e.g., shown in FIGS. 1A and 2C), with second engagement portions 143 (when gearbox 100 is in the second gear, as, e.g., shown in FIG. 1B), or not engaged with either first engagement portions 133 or with second engagement portions 143 (when gearbox 100 is in the neutral gear, as, e.g., shown in FIG. 1C). Referring to the example when shifting engagement portions 153 are engaged first engagement portions 133, shifting engagement portions 153 overlap with first engagement portions 133 along center axis 101 of gearbox 100. In order for this engagement (overlap) to occur while shifting into the first gear, shifting engagement portions 153 should not interfere first engagement portions 133. In other words, the engagement should occur at one or more particular relative angular orientations of shifting engagement portions 153 and first engagement portions 133 or, more generally, at one or more particular relative angular orientations of shifting mechanism 150 and first ring gear 130. Various sensors described above may help with determining when shifting can occur as will be now described with reference to FIGS. 2D and 2E.

Figure 2D:
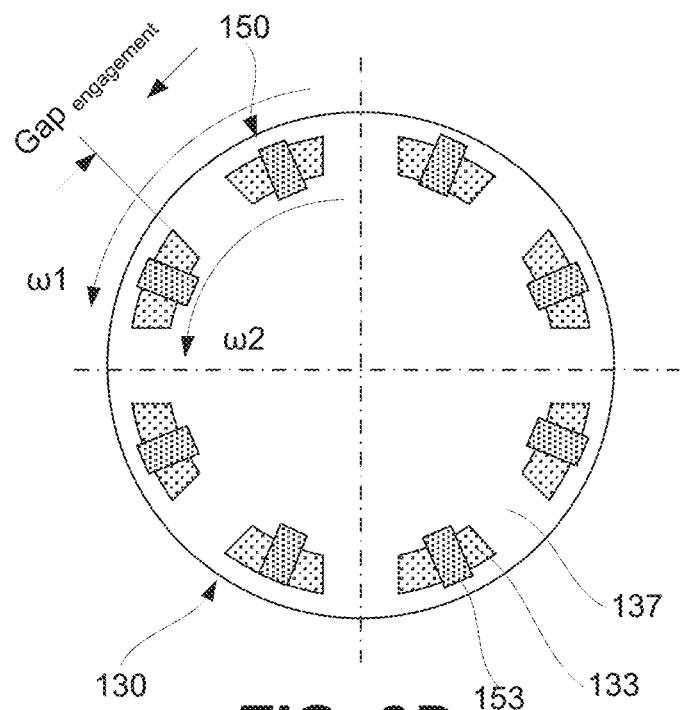
FIGS. 2D and 2E are schematic representations of two different positions of the engagement portion of the second ring gear relative to the engagement portion of the shifting mechanism, in accordance with some embodiments.
Figure 2E:
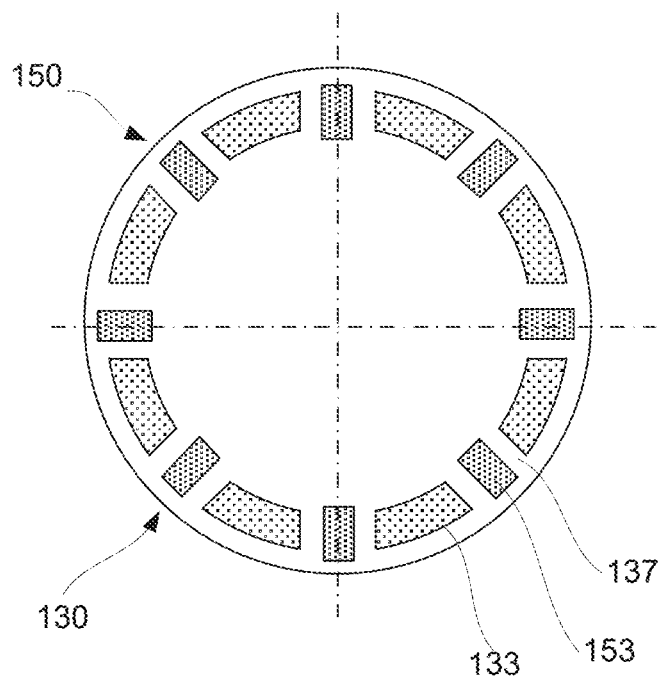

Specifically, FIGS. 2D and 2E are schematic cross-sectional views of shifting engagement portions 153 and first engagement portions 133 within a plane perpendicular to center axis 101 of gearbox 100 showing two relative angular positions shifting mechanism 150 and first ring gear 130. Other components of gearbox 100 are not shown for clarity of illustrating this shifting concept. One having ordinary skill in the art would recognize that in order to engage shifting engagement portions 153 and first engagement portions 133 (to cause the overlap), each of shifting engagement portions 153 has to be positioned between two adjacent first engagement portions 133 as, for example, shown in FIG. 2E. In other words, shifting engagement portions 153 has to be aligned with gaps 137 between first engagement portions 133. The engagement is not possible when shifting engagement portions 153 overlap (even partially) with first engagement portions 143 as, for example, shown in FIG. 2D.

It should be noted that prior to engaging shifting engagement portions 153 and first engagement portions 133, one or both of first ring gear 130 and shifting mechanism 150 may rotate. Their rotational speeds may be different (designated as ω1 and ω2 in FIG. 2D). For example, shifting mechanism 150 may be engaged to second ring gear 140, which rotates at a different speed than first ring gear 130. As a result of this rotation speed difference, the relative orientation of first ring gear 130 and shifting mechanism 150 continue to change, such as going from the state illustrated in FIG. 2D to the state illustrated in FIG. 2E. Furthermore, both of these states may be repeated overtime, e.g., with a certain frequency when the rotation speed difference is constant.

To ensure that the engagement happens at the right state and the right time, the relative angular orientation of shifting mechanism 150 and first ring gear 130 may be determined using sensors. The output of these sensors 1 may be used to trigger shifting mechanism 150 and to ensure the correct timing of the engagement. In some embodiments, the sensor output may be combined with the output of other sensors (such as speed sensors). Furthermore, other factors, such as rotation speeds of shifting mechanism 150 and first ring gear 130, the travel distance of shifting mechanism 150, the size of spacing 137 relative to the size of engagement portion 153, the shifting speed, and the like may be considered to determine the right timing for shifting. Some of these aspects are further described below with reference to FIG. 4.

While FIGS. 2C-2E illustrate various aspects of engagement between first ring gear 130 and shifting mechanism 150, one having ordinary skill in the art would recognize that the same or similar aspects may be used for engaging second ring gear 140 and shifting mechanism 150.

Examples of Operating Gearboxes

Figure 4:
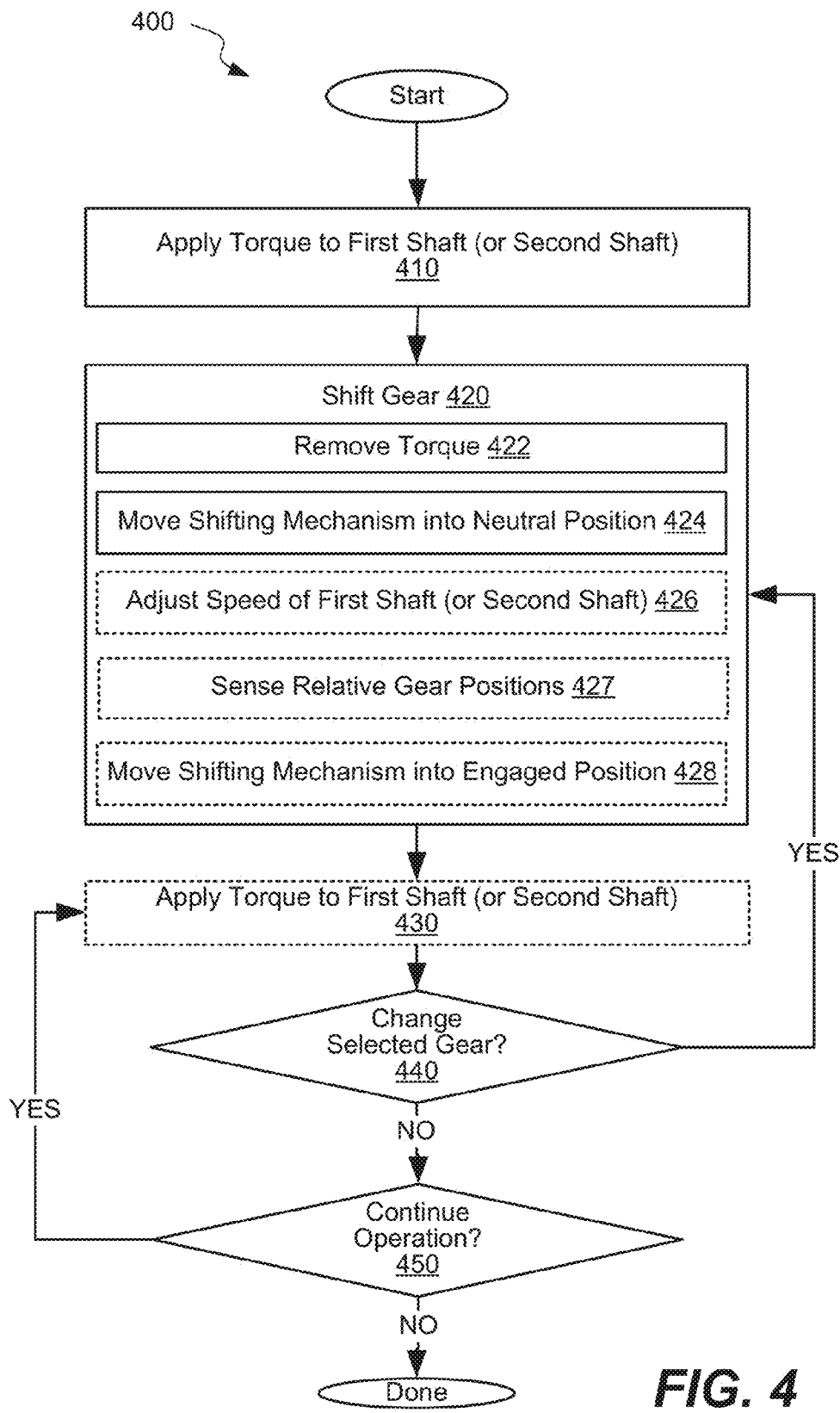
FIG. 4 is a process flowchart corresponding to a method of operating a gearbox, in accordance with some embodiments.

FIG. 4 is a process flowchart corresponding to method 400 of operating gearbox 100, in accordance with some embodiments. Various examples of gearbox 100 are described above. In some embodiments, gearbox 100 may be coupled to first shaft 210 coupled or including sun gear 110. Gearbox 100 may comprise first planet gear 122 of compound planet gear assembly 120. First planer gear 122 may be engaged to sun gear 110. First planet gear 122 may be also engaged to first ring gear 130. First ring gear 130 is engaged with shifting mechanism 150 while gearbox 100 is in the first selected gear. Second ring gear 140 of gearbox 100 engages second planet gear 124 of compound planet gear assembly 120. Furthermore, second ring gear 140 is not engaged with shifting mechanism 150 while gearbox 100 is in the first selected gear.

Method 400 may comprise applying torque to first shaft 210 coupled to sun gear 110 (refer to block 410 in FIG. 4) while gearbox 100 is in the first selected gear. For example, a motor may be coupled to first shaft 210 as further described below with reference to FIG. 5. While the following operations are described with the torque applied to first shaft 210, one having ordinary skill in the art would understand that gearbox 100 may similarly operate with torque is applied to second shaft 220.

Figure 3:
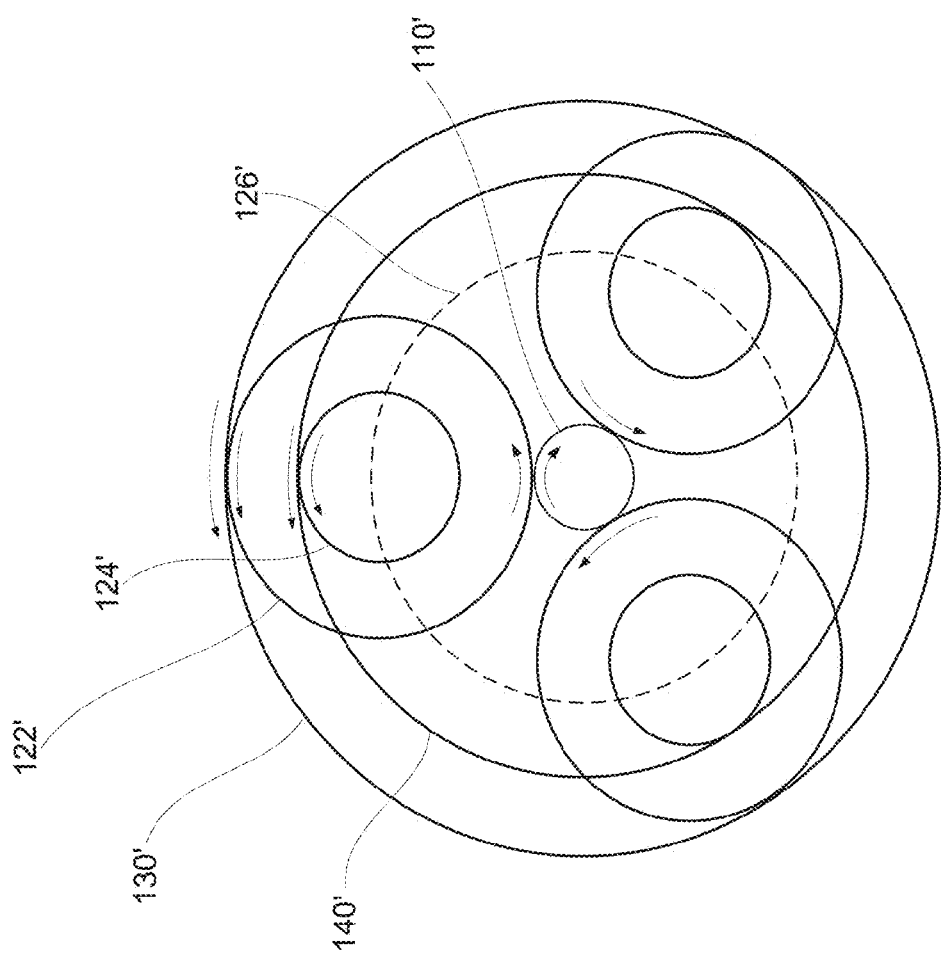
FIG. 3 is a schematic representation of rotation directions of different gears in a gearbox, in accordance with some embodiments.

Applying the torque to first shaft 210 may cause rotation of sun gear 110, which triggers rotation of other gears. Specifically, FIG. 3 is a schematic representation of different gears, where element 110' is a representation of sun gear 110 or, more specifically, an approximation of the outer surface of sun gear 110. Element 122' is a representation of first planer gear 122 or, more specifically, an approximation of the outer surface of first planet gear 122. Element 124' is a representation of second planer gear 124 or, more specifically, an approximation of the outer surface of second planet gear 124. Element 126' is a representation of planer gear carrier 126 or, more specifically, an approximation of the circular portion of planer gear carrier 126 passing through the centers of first planet gear 122 and second planet gear 124. Element 130' is a representation of first ring gear 130 or, more specifically, an approximation of the inner surface of first ring gear 130. Finally, element 140' is a representation of second ring gear 140 or, more specifically, an approximation of the inner surface of second ring gear 140.

With reference to FIG. 3, rotation of first shaft 210 may cause rotation of sun gear 110 (represented by element 110') in the clockwise direction. Since first planet gear 122 (represented by element 122') is engaged with sun gear 110, the clockwise rotation of sun gear 110 will cause counterclockwise rotation of first planet gear 122. As noted above, first planet gear 122 and second planet gear 124 (represented by element 124') are rotated in the same direction and at the same speed. Since first planet gear 122 is also engaged first ring gear 130 (represented by element 130'), the counterclockwise rotation of first planet gear 122 will cause counterclockwise rotation of first ring gear 130. Similarly, the engagement between second planet gear 124 and second ring gear 140 (represented by element 140'). Shifting mechanism 150 not represented in FIG. 3 may be engaged with either first ring gear 130 or second ring gear 140 and, if engaged, will also rotated in the counterclockwise direction and turn second shaft 220 in the same direction as well. Planet gear carrier 126 (represented by element 126') of compound planet gear assembly 120 may be stationary when applying the torque to the first shaft 210 thereby rotating the sun gear 110.

Method 400 may involve shifting from the first selected gear to the second selected gear of gearbox 100 (refer to block 420 in FIG. 4). This operation may comprise removing the torque applied to first shaft 210 (refer to block 422 in FIG. 4), shifting from the first selected gear to a neutral gear of gearbox 100 (refer to block 424 in FIG. 4), changing a rotational speed of first shaft 210 (refer to block 426 in FIG. 4), and shifting from the neutral gear to the first selected gear of gearbox 100 (refer to block 428 in FIG. 4).

In some embodiments, removing the torque applied to first shaft 210 comprises controlling a motor (e.g., motor 530 shown in FIG. 5) coupled to first shaft 210. When gearbox 100 is in the neutral gear, neither first ring gear 130 nor second ring gear 140 is engaged with shifting mechanism 150.

In some embodiments, shifting from the first selected gear to the neutral gear of gearbox 100 comprises sliding shifting mechanism 150 along principal axis 101 of gearbox 100 away from first ring gear 130. Sliding shifting mechanism 150 may be completed prior to contacting second ring gear 140.

In some embodiments, changing the rotational speed of first shaft 210 comprises matching the rotation speed of second ring gear 140 to the rotation speed of second shaft 220. This matching may comprise receiving an input from a sensor indicating the rotation speed of second shaft 220 and calculating the needed rotational speed of first shaft 210. In some embodiments, changing the rotational speed of first shaft 210 comprises controlling the motor (e.g., motor 530 shown in FIG. 5) coupled to first shaft 210. Shifting from the neutral gear into the second selected gear of gearbox 100 may comprise sliding shifting mechanism 150 along principal axis 101 of gearbox 100 away from first ring gear 130.

In some embodiments, shifting operation 420 may also involve sensing or determining relative angular positions of shifting mechanism 150 and one of first ring gear 130 or second ring gear 140 (schematically shown as optional block 427 in FIG. 4). More specifically, the angular position of a ring gear that is about to be engaged with shifting mechanism 150, is determined relative to shifting mechanism 150. In other words, when gearbox 100 is shifted into the first selected gear, the angular positions of shifting mechanism 150 and first ring gear 130 are determined. Alternatively, when gearbox 100 is shifted into the second selected gear, the angular positions of shifting mechanism 150 and second ring gear 140 are determined. The relative position may be determined using one or more sensors of gearbox 100 as described above with reference to FIG. 2C.

When the ring gear (based on selected shifting) and shifting mechanism 150 are rotated at different speeds, their relative positions change overtime. However, a particular position needed for engagement may be also repeated (e.g., with at a set frequency when the rotation speed difference is constant). In this case, the relative positions are determined at a particular time and this information may be combined with at least the rotational speed information for shifting mechanism 150 and the ring gear. In some embodiments, other factors are also considered. As described above with reference with to FIGS. 2C-2E, this sensing of relative positions may be used to ensure that engagement is performed without crashing engagement portions of shifting mechanism 150 and the ring gear into each other when shifting mechanism 150 is advanced toward the selected ring gear. As such, the timing of operation 428 may be selected based on information obtained during operation 427.

After shifting into the second selected gear, method 400 may involve applying the torque to first shaft 210 (refer to block 430 in FIG. 4). Second ring gear 140 is engaged with shifting mechanism 150 while gearbox 100 is in the second selected gear. First ring gear 130 is not engaged with shifting mechanism 150 while gearbox 100 is in the second selected gear.

In some embodiments, method 400 further comprises further shifting of selected gears as indicated by decision block 440. For example, method 400 may comprise shifting from the second selected gear to the first selected gear of gearbox 100 (repeating operation 420 in a different order) and applying the torque to first shaft 210 while gearbox 100 is in the first selected gear (repeating operation 430). Second ring gear 140 is not engaged with shifting mechanism 150 while gearbox 100 is in the first selected gear. On the other hand, first ring gear 130 is engaged with shifting mechanism 150 while gearbox 100 is in the first selected gear.

In some embodiments, method 400 further comprises shifting to the neutral gear of gearbox 100 (repeating operation 420 partially). Specifically, this operation may comprise removing the torque applied to first shaft 210 (refer to block 422 in FIG. 4) and shifting from the first selected gear (or from the second selected gear) into to a neutral gear of gearbox 100 (refer to block 424 in FIG. 4). Second ring gear 140 is not engaged with shifting mechanism 150 while gearbox 100 is in the neutral gear. Furthermore, first ring gear 130 is not engaged with shifting mechanism 150 while gearbox 100 is in the neutral gear. One having ordinary skill in the art would understand the process of switching from the neutral gear into the first selected gear (or to the second selected gear).

Shifting and torque applying operations of method 400 may be repeated multiple times as reflected by decision block 450 in addition to decision block 440.

Examples of Systems Utilizing Gearboxes

Figure 5:
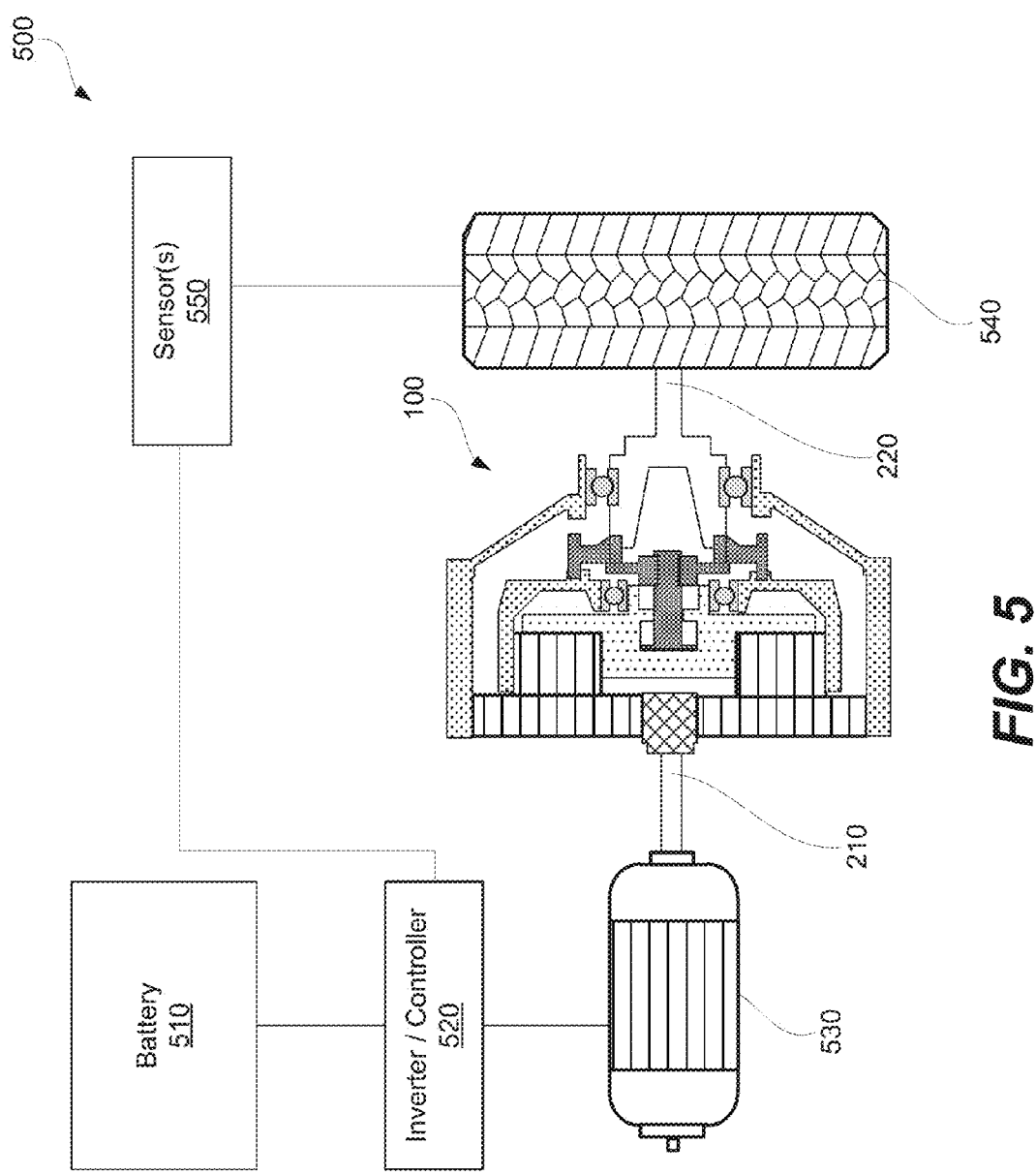
FIG. 5 is a schematic representation of a system utilizing a gearbox, in accordance with some embodiments.

FIG. 5 is a schematic representation of system 500 utilizing gearbox 100, in accordance with some embodiments. In addition to gearbox 100, system may include motor 530 having first shaft 210 coupled to gearbox 100. As noted above, sun gear 110 of first shaft 210 may be engaged with first planet gear 122 of gearbox 100. In some embodiments, first shaft 210 is a part of gearbox 100 or a standalone component coupled to motor 530. System 500 may also include battery 510 (e.g., a battery pack) for supplying power to motor 530 (e.g., when motor 530 is an electrical motor). It should be noted that motor 530 may be also used in power regenerative mode and may be used to supply power to battery 510. System 500 may also include inverter 520, which in some embodiments may be combined with a controller. Alternatively, the inverter and controller may be separate elements. The controller may receive various input from one or more sensors 550, such as a speed sensor for measuring the speed of wheel 540. Second shaft 220 of gearbox 100 may be coupled to a wheel, either directly or through another component, such as another gearbox, differential, and the like.

Electric traction motors can produce higher power density output, measured in kW per kg, if they are able to operate at higher rotational speeds. However, to operate at higher speeds the generated output speed of these motors must be matched to the wheel speed through a speed reduction transmission that translates the motor speed into an output speed equaling the wheel speed. In addition, most electric traction motors display a torque curve that is flat a constant in the speed range from zero up to a maximal speed. A maximal speed of the motor is reached when the induced electromotive force (EMF) produced by the current running through the motor equals the voltage supplied to the motor. Thus, for most electric traction motors the power output rises linearly with increasing speed, since a motor's power output is defined by the product of the motor's generated torque and the rotational output speed. From this power-speed relationship follows that a multi-speed transmission would allow a motor to deliver higher power to the wheels at lower speeds at a given maximal speed of the motor.

Planetary gear transmissions are used as speed reduction transmissions. Advantages of planetary gear transmissions include a high reduction ratio and high power transmission in a compact and lightweight package, eliminating any radial loads that are applied to a motor's output shaft. For very high traction motors speeds, e.g. 10,000 rpm to 30,000 rpm, a first stage uses a planetary gear to reduce the speed of the motor's output shaft to speeds typical for automotive transmissions, e.g. 3,000 rpm to 6,000 rpm. At a second stage, a conventional multispeed gearshift mechanism is employed, further reducing the output speed to match the wheel speed.

The present disclosure has been described in particular detail with respect to several possible embodiments. Those of skill in the art will appreciate that the invention may be practiced in other embodiments. For example, embodiments of the invention have been described in the context of a multi-speed transmission gear for high rotational input speeds of electric motor vehicles. However, it is appreciated that embodiments may also be practiced in other mechanical environments that include components to enable the transmission from an input speed to different output speeds as described above. For example, outside the context of electric motors, transmissions are typically used in other machinery that transforms rotational energy into translational energy.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method of operation a gearbox, the method comprising:
    applying torque to a first shaft coupled to a sun gear while the gearbox is in a first selected gear,
        a first planet gear of a compound planet gear assembly engaging the sun gear and a first ring gear,
        the first ring gear engaging a shifting mechanism while the gearbox is in the first selected gear,
        a second ring gear engaging a second planet gear of the compound planet gear assembly, and
        the second ring gear not engaging the shifting mechanism while the gearbox is in the first selected gear;
    shifting from the first selected gear and into a second selected gear of the gearbox; and
    after shifting into the second selected gear, applying the torque to the first shaft;
        the second ring gear engaging the shifting mechanism while the gearbox is in the second selected gear, and
        the first ring gear not engaging the shifting mechanism while the gearbox is in the second selected gear.

2. The method of claim 1, wherein the shifting from the first selected gear and into the second selected gear of the gearbox comprises:
    removing the torque applied to the first shaft;
    shifting from the first selected gear to a neutral gear of the gearbox;
    changing a rotational speed of the first shaft; and
    shifting from the neutral gear to the first selected gear of the gearbox.

3. The method of claim 2, wherein the removing the torque applied to the first shaft comprises controlling a motor coupled to the first shaft.

4. The method of claim 2, wherein, when the gearbox is in the neutral gear, neither the first ring gear nor the second ring gear is engaged with the shifting mechanism.

5. The method of claim 2, wherein shifting from the first selected gear to the neutral gear of the gearbox comprises sliding the shifting mechanism along a principal axis of the gearbox away from the first ring gear.

6. The method of claim 5, wherein sliding the shifting mechanism completes prior to contacting the second ring gear.

7. The method of claim 2, wherein changing the rotational speed of the first shaft comprises matching a rotation speed of the second ring gear to a rotation speed of a second shaft.

8. The method of claim 7, wherein matching the rotation speed of the second ring gear to the rotation speed of the second shaft comprises receiving an input from a sensor indicating the rotation speed of the second shaft and calculating the rotational speed of the first shaft.

9. The method of claim 2, wherein changing the rotational speed of the first shaft comprises controlling a motor coupled to the first shaft.

10. The method of claim 2, wherein shifting from the neutral gear into the second selected gear of the gearbox comprises sliding the shifting mechanism along a principal axis of the gearbox away from the first ring gear.

11. The method of claim 1, wherein a planet gear carrier of the compound planet gear assembly is stationary when applying torque to the first shaft thereby rotating the sun gear.

12. The method of claim 1, further comprising:
    shifting from the second selected gear to the first selected gear of the gearbox; and
    applying the torque to the first shaft;
        the second ring gear not engaging the shifting mechanism while the gearbox is in the first selected gear, and
        the first ring gear engaging the shifting mechanism while the gearbox is in the first selected gear.

13. The method of claim 1, further comprising:
    shifting to a neutral gear of the gearbox,
        the second ring gear not engaging the shifting mechanism while the gearbox is in the neutral gear, and
        the first ring gear not engaging the shifting mechanism while the gearbox is in the neutral gear.

14. The method of claim 1, wherein shifting from the first selected gear and into the second selected gear of the gearbox comprises determining a position of the second selected gear relative to the shifting mechanism.

15. The method of claim 1, wherein the second ring gear is rotatably supported by a planet gear carrier of the compound planet gear assembly.

16. The method of claim 1, wherein the first ring gear is rotatably supported by the second shaft.

17. The method of claim 1, wherein the gearbox comprises a housing, and wherein a planet gear carrier of the compound planet gear assembly is non-rotatable supported by the housing.

18. The method of claim 1, wherein the shifting mechanism is slidably supported by the second shaft.

19. The method of claim 1, wherein the first planet gear continuously engages to the first ring gear.

20. The method of claim 1, wherein the second planet gear continuously engages to the second ring gear.

* * * * *